UNITED STATES PATENT OFFICE.

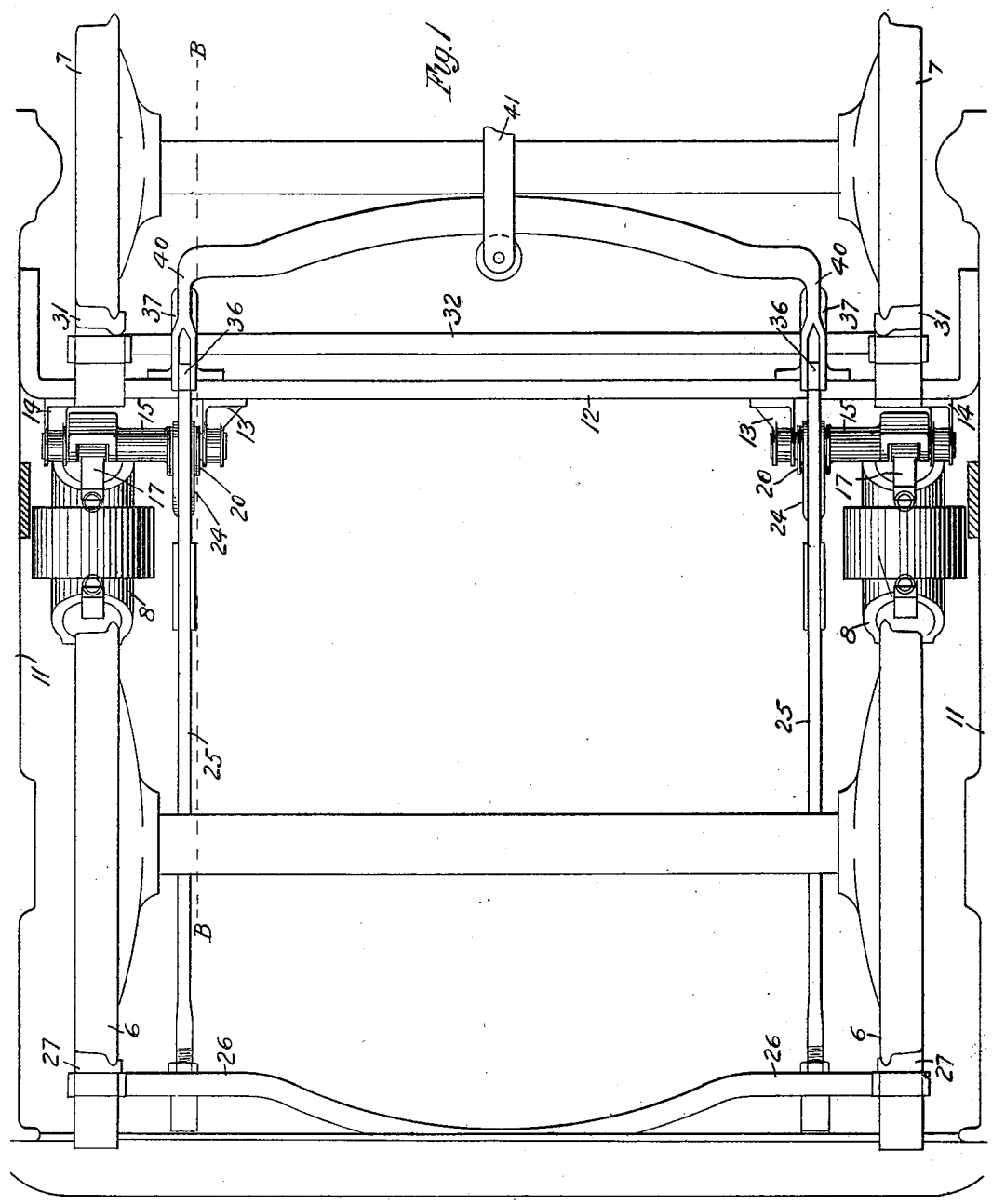

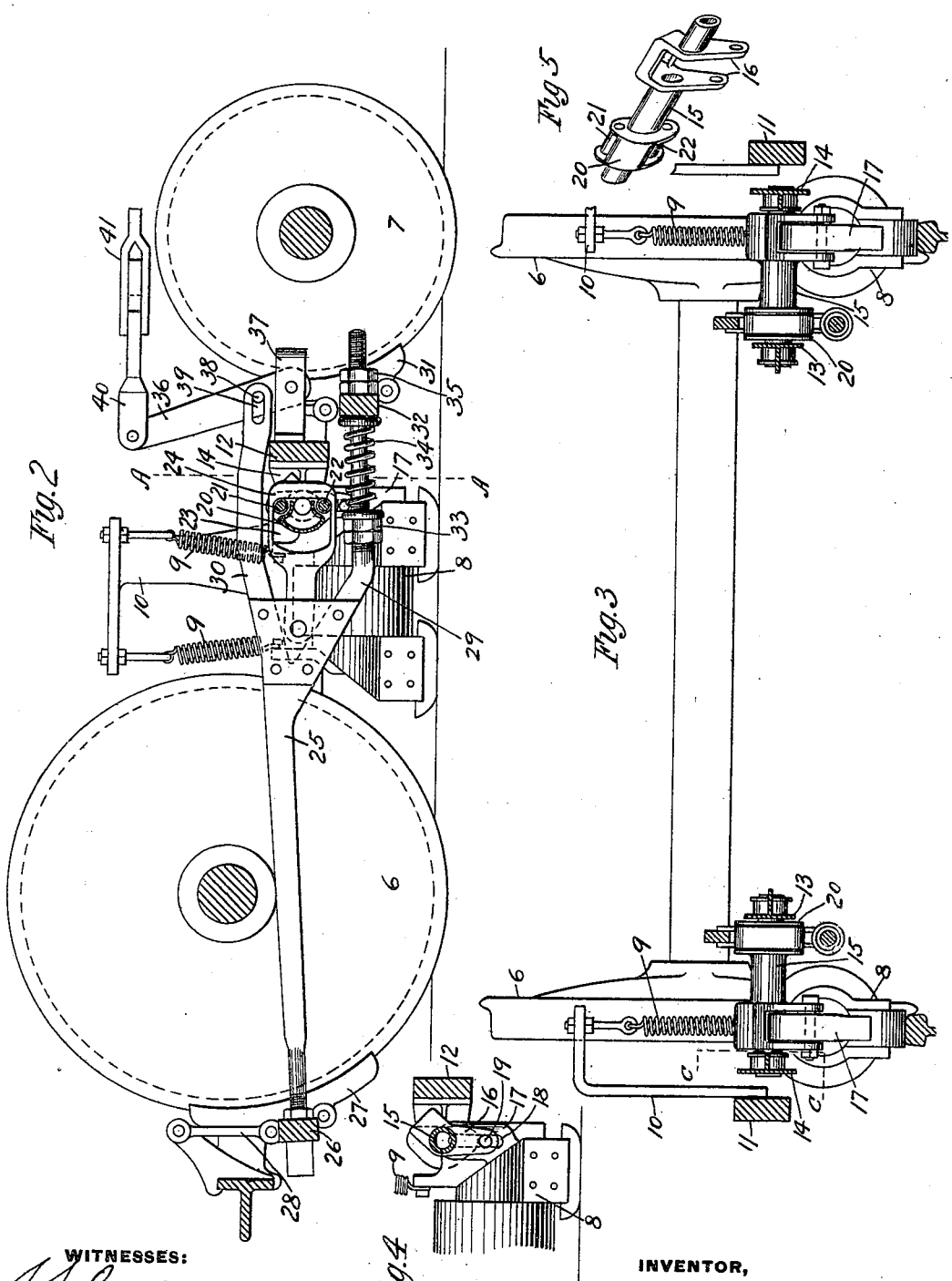

FRANK C. NEWELL, OF WILKINSBURG, PENNSYLVANIA, ASSIGNOR TO THE WESTINGHOUSE AIR BRAKE COMPANY, OF PITTSBURG, PENNSYLVANIA.

ELECTRIC BRAKE.

SPECIFICATION forming part of Letters Patent No. 667,730, dated February 12, 1901.

Application filed May 2, 1900. Serial No. 15,225. (No model.)

*To all whom it may concern:*

Be it known that I, FRANK C. NEWELL, a citizen of the United States, residing at Wilkinsburg, county of Allegheny, State of Pennsylvania, have invented or discovered a certain new and useful Improvement in Electric Brakes, of which improvement the following is a specification.

My invention relates to electric brakes for cars, and particularly to that class of brakes in which both wheel-shoes and track-shoes are employed.

The object of the invention is to provide a new and improved means whereby the application of the rail-shoe will operate to set the wheel-shoes when the car is running in either direction, and my improvement is specially adapted to be employed where the space is limited between the wheels to which it is applied. In cars which are provided with a multiple truck at each end the wheels of one pair are usually so close to those of the other pair that the amount of space for the rail-shoe and the connections to the wheel-shoes is very limited.

My invention consists in the combination of a rail-shoe and connections therefrom to the wheel-shoes in compact form and adapted specially to be applied to a multiple truck of a car, the connections being such that the wheel-shoes are set by the operation of the rail-shoe whichever way the car may be running.

In the drawings, Figure 1 is a plan view showing a double or four-wheeled truck with my improvement applied thereto. Fig. 2 is a longitudinal sectional view taken on the line B B of Fig. 1. Fig. 3 is a transverse sectional view taken on the line A A of Fig. 2. Fig. 4 is a detail sectional view taken on the line C C of Fig. 3, and Fig. 5 is a perspective view of the rock-shaft.

I have shown my improved brake device applied to a "maximum-traction" truck—that is, one having one pair of large wheels 6 and one pair of smaller wheels 7—most of the weight of the car being carried by the large wheels. The magnetic rail-shoe 8 is suspended between the wheels of the truck in close proximity to the rail by means of springs 9, attached to a bracket 10, which is supported on the frame 11 of the car-truck. To the cross-piece 12 of the truck-frame are secured the brackets 13 and 14. In these brackets bearings are provided for the ends of the rock-shaft 15, which has a double crank-arm 16 between its ends. The magnetic brake-shoe has a projecting plate or arm 17 secured thereto, which is also connected to the crank-arm 16 of the rock-shaft. As shown in the drawings, the plate 17 projects between the crank-arms 16 of the rock-shaft and is provided with a slot 18, through which the pin 19 passes, which connects the two arms of the crank. While I have shown and described this particular means of connection, other means for connecting the rail-shoe with the crank of the rock-shaft may be used without departing from my invention. A cam-shaped piece 20, having two bearing-pins 21 and 22 connecting the two sides thereof, is firmly secured on the rock-shaft. This forms what is virtually a cam with two bearing-surfaces, one above and one below the center line of the rock-shaft, and it is arranged to operate in the slot 23 of the bar 24. The slot 23 is made of such shape as to coöperate with the cam-piece 20, and both of the bearing surfaces or pins of the cam engage with the bar 24 at the end of the slot, so that the bar 24 will be moved when the cam is oscillated in either direction. The bar 24 is secured to the rod 25, which is pivotally connected to the brake-beam 26 of the wheel-shoes 27 of the large wheels of the truck. These wheel-shoes are suspended by links 28 from the truck-frame. The rod 25 is also provided with two branches 29 and 30, the former being connected to the beam 32, which carries the wheel-shoes of the other or small pair of wheels of the truck, and the latter being connected to hand brake-lever 36 of the car.

The brake-shoes 31 of the wheels 7 are suspended by links from the cross-beam 12 of the truck-frame and are connected together by brake-beam 32.

The branch rod 29 may be rigidly connected to the brake-beam 32, or it may have a yielding connection therewith. As shown in the drawings, the branch rod 29 is provided with an intermediate threaded portion on which are screwed the nuts 33. The end of the rod 29 passes through an opening in the brake-beam 32, in which it is adapted to slide, and a spiral spring 34 is placed on the rod between the adjustable nuts 33 and the brake-beam. Nuts 35 are also screwed onto the end of the rod on the other side of the brake-beam 32. This yielding or spring connection to one pair of wheel-shoes provides means for compensating for the unequal wear of the wheel-shoes, so that the application of all the wheel-shoes is always assured. The wheel-shoes 31 are held toward the wheels 7 by the springs 34, so that when the brakes are applied these shoes 31 will bear against the wheels 7 before the wheel-shoes 27 are set against the wheels 6. Then by a further movement of the rod 25 the wheel-shoes 27 are set against the wheels 6, and thus all the wheel-shoes will be effectively applied. By this means also the force with which the brakes are applied to the small wheels may be adjusted by varying the compression or strength of the spring. The hand brake-lever 36 is pivoted in a bracket 37, secured to the cross-piece 12 of the truck-frame, and it is provided with a pin 38, which projects into a slot 39 in the branch rod 30. The hand brake-levers 36 are operated by the yoke 40, connected to the pull-rod 41.

When the brakes are applied by hand, the pin 38 engages the end of the slot 39 and moves the rod 25, thus forcing the wheel-shoes against the wheels; but when the brakes are applied by means of the magnetic rail-shoe the rod 25 may slide upon the pin 38 without moving the hand brake-lever 36.

The operation of the device is as follows: Suppose the car to be moving toward the left and the electric current be turned onto the magnetic rail-shoe 8. This rail-shoe will then be drawn down upon the rail and by frictional contact will tend to drag, thus securing pull in the direction opposite to that in which the car is running. As the rail-shoe is supported only by the yielding springs 9, this movement will effect a partial rotation of the rock-shaft 15 by means of the crank 16. The bar 24 will be moved to the right by means of the lower bearing surface or pin 22 of the cam operating against the end of the slot 23, and the wheel-shoes will be applied to both pairs of wheels by the rod 25 and branch rod 29. The first part of the movement of the bar 24 sets the wheel-shoes 31 against the wheels 7 by means of the branch rod 29 and spring 34. Then by the further movement of the bar 24 the spring 34 is compressed and the wheel-shoes 27 are set against the wheels 6. If the rail-shoe is applied when the car is moving in the opposite direction, the rotation of the crank and shaft will also be in the opposite direction; but in this case the upper bearing surface or pin 21 engages the end of the slot in bar 24 and moves the same to the right, as before, thus applying the brake-shoes to the wheels.

Some of the connecting parts—such as the bar 24, cam, rock-shaft, crank, and the arm projecting from the rail-shoe—are usually made of brass or some non-magnetic material, so as to prevent the wheels from becoming magnetized.

The arrangement of the rock-shaft with its double cam and the slotted bar forms a compact connection between the rail-shoe and the wheel-shoes, which requires but a small amount of space and operates to apply the brakes when the car is running in either direction.

I claim as my invention and desire to secure by Letters Patent—

1. A brake mechanism comprising a rail-shoe, wheel-shoes for the wheels, and connections between the rail-shoe and wheel-shoes including a rock-shaft and a cam adapted to set the wheel-shoes by applying the rail-shoe.

2. A brake mechanism for cars, comprising a magnetic rail-shoe, wheel-shoes, a rock-shaft adapted to be operated by the rail-shoe and a double cam so arranged as to set the wheel-shoes by applying the rail-shoe when the car is moving in either direction.

3. A brake mechanism for cars, comprising a rail-shoe, wheel-shoes, a rock-shaft adapted to be operated when the rail-shoe is applied, a double cam on the rock-shaft so arranged as to set the wheel-shoes by the rail-shoe when the car is moving in either direction.

4. A brake mechanism for cars, comprising a rail-shoe, wheel-shoes for the wheels, a rock-shaft operated by the rail-shoe, a cam actuated by the rock-shaft and a slotted bar connected to the wheel-shoes and to the cam.

5. A brake mechanism comprising a rail-shoe, wheel-shoes for the wheels, a rock-shaft having a crank connected to the rail-shoe, a double cam on the shaft and a slotted bar connected to the wheel-shoes whereby the wheel-shoes are set by applying the rail-shoe when the car is running in either direction.

6. A brake mechanism for cars, comprising a magnetic rail-shoe, wheel-shoes for the wheels, a rock-shaft having a crank connected with the rail-shoe, a double cam on the shaft and a slotted bar, in which the cam operates, connected to the wheel-shoes.

7. A brake mechanism for multiple trucks, comprising a rail-shoe, wheel-shoes adapted to be applied by the rail-shoe, and connections whereby the wheel-shoes are set with greater force against one pair of wheels than another by the rail-shoe.

8. A brake mechanism for multiple trucks, comprising a rail-shoe, wheel-shoes adapted to be applied by the rail-shoe, and a yielding connection whereby one pair of wheel-shoes is applied with greater pressure than another pair.

9. A brake mechanism for multiple trucks, comprising a rail-shoe, wheel-shoes for the wheels, a yielding connection between the wheel-shoes of the different truck-wheels, and means connected to the rail-shoe for applying the wheel-shoes by longitudinal movement of the rail-shoe.

10. A brake mechanism for multiple trucks, comprising a magnetic rail-shoe, wheel-shoes adapted to be operated by longitudinal movement of the rail-shoe, and a yielding connection between the wheel-shoes of different truck-wheels.

In testimony whereof I have hereunto set my hand.

FRANK C. NEWELL.

Witnesses:
R. F. EMERY,
JAS. B. MACDONALD.